United States Patent [19]

Kent et al.

[11] Patent Number: 4,731,270

[45] Date of Patent: Mar. 15, 1988

[54] LAMINATED TROUGH FOR A SPIRAL CONCENTRATOR AND PROCESS FOR CONSTRUCTION OF SAME

[76] Inventors: Edward W. Kent; John W. S. Roeder, both of 2310 Empire Way, Boise, Id. 83709

[21] Appl. No.: 874,395

[22] Filed: Jun. 16, 1986

[51] Int. Cl.$^4$ ............................................. B32B 27/00
[52] U.S. Cl. .................................. 428/36; 428/423.3; 428/217; 428/358; 428/423.7; 209/459; 209/211
[58] Field of Search ..................... 428/358, 217, 423.3, 428/36, 423.7; 209/459, 211

[56] References Cited

U.S. PATENT DOCUMENTS

| | | | |
|---|---|---|---|
| 3,099,621 | 7/1963 | Close | 209/459 |
| 3,703,571 | 11/1972 | Roberts | 428/423.3 |
| 3,936,576 | 2/1976 | Kay | 428/423.3 |
| 4,042,751 | 8/1977 | Roth | 428/423.3 |
| 4,059,506 | 11/1977 | Bryson | 209/211 |
| 4,070,274 | 1/1978 | Bryson | 209/459 |
| 4,416,768 | 11/1983 | Nosseir | 209/459 |
| 4,476,980 | 2/1984 | Giffard | 209/459 |
| 4,664,789 | 5/1987 | Lees et al. | 209/459 |

*Primary Examiner*—Edith Buffalow
*Attorney, Agent, or Firm*—Paul F. Horton

[57] ABSTRACT

A laminated trough for a spiraled mineral concentrator; the trough composed of two or more laminates, chemically bonded, and the process for constructing the same.

The trough includes a top laminate of highly abrasion-resistant soft elastomer, the elastomer applied as a liquid directly to a release treated mold; and a bottom laminate composed of a rigid material which is applied to the soft elastomer before final curing of the latter, the bottom laminate providing structural support for the soft elastomer.

An intercoat, chemically bonded to both top and bottom laminates, may also be provided.

4 Claims, No Drawings

LAMINATED TROUGH FOR A SPIRAL CONCENTRATOR AND PROCESS FOR CONSTRUCTION OF SAME

BACKGROUND OF THE INVENTION

1. Field of the Invention

This invention relates, in general, to spiral mineral concentrators and, more particularly, to troughs for such concentrators, and even more particularly to laminated troughs, bonded chemically, and the process for producing the same.

2. Description of the Prior Art

Spiral concentrators, having one or more helical troughs, are widely used for the separation and concentration of minerals of varying densities by a gravity wash, as typified by the separator of P. J. Giffard, U.S. Pat. No. 4,476,980. Spiral concentrators have been in use for mineral concentration since before 1900, and materials of construction have been wood, cast iron, rubber, and more recently, urethane elastomer. Urethane elastomer has the distinct advantage of being moldable in a single piece which eliminates the roughness and leakage at joint; is lighter in weight; is moldable in a wide variety of shapes and textures; and has excellent abrasion and corrosion resistance characteristics.

A serious problem with the ultimate abrasion resistant urethanes, however, is that they are too flexible in thin sections to maintain exacting shape control. One solution has been to make elastomer lined steel troughs for spiral concentrators. Another solution is to make fiberglass reinforced molded troughs by conventional spray or layup methods, demold, and then to coat the surface with a thin elastomeric sprayed coating. These products are heavy, expensive, and there is a tendency for delamination of urethane from dissimilar surfaces under humid heat ageing—a typical in-use environment. Further problems are that spray applications may yield uneven surface build-up; the fine detail of the mold being obscured, and there may be sufficient shrinkage of polyester type fiberglass systems to drastically change shape in a non-uniform manner during the curing cycle.

SUMMARY OF THE INVENTION

The present invention provides a solution to these weight; cost; structural deficiency; and delamination problems by providing a laminated trough having a working surface of highly abrasion resistant soft elastomer which is chemically bonded to a supporting laminate of rigid elastomer of high structural integrity; and the process for producing the same. A more detailed description of the trough and process may be found in the appended claims.

It is therefore a primary object of the present invention to provide a trough for a spiral concentrator which includes a top laminate of highly abrasion resistant soft elastomer and a bottom laminate which is rigid and structurally sound and which is chemically bonded to the top laminate.

It is also a primary object of the present invention to provide a process for the construction of said trough.

It is a further object of the present invention to provide a trough which includes a top laminate of soft urethane elastomer and a bottom laminate of rigid urethane elastomer which is chemically bonded to the top laminate; and a process for constructing the same.

Additional objects and advantages will become apparent and a more thorough and comprehensive understanding may be had from the following description.

DETAILED DESCRIPTION OF THE INVENTION

Preferred embodiments of the trough of the present invention permit the single stage production of soft urethane elastomer laminate and rigid material laminate with a chemical bonding between the laminates and with a superior molded reproduction of detail since the working surface profile is taken directly off the mold.

Generally, abrasion resistant urethane elastomers, having a shear modulus of less than 2000 psi, are substantially linear polymers comprising a liquid polyisocyanate, usually in the form of a prepolymer, ie., a polyisocyanate of the class of aromatic diisocyanates such as 2,4 toluene diiosocyanate, known as TDI, and 4,4' diphenylmethane diiosocyanate, known as MDI, and aliphatic higher molecular weight polyisocyanates such as $H_{12}MDI$, pre-reacted with a chain extender of polyether, polyester, polycaprolactone, or simple glycol or triol, to assist handling through a reduction of volatile monomer, especially with TDI, a reduction of exothermic reaction, increase of viscosity, and to bring the ratio of prepolymer to curing agent to a simpler ratio. A further purpose of the prepolymer route is to be able to get the slower reaction of isocyanate with secondary hydroxyl group to take place under controlled conditions such as stirring at 90 degrees Celsius for six hours, after stirring at 30 degrees Celsius for sixteen hours. In this way, with TDI, the paraposition isocyanate, known as NCO, will be preferentially used. When this prepolymer is later mixed in proper ratio with a hindered aromatic diamine, the working life of that mixture may be extended, often to about fifteen minutes. Without the prepolymer step, the pot life may be much shorter, and reaction of the chain-extender may be incomplete, resulting in weak, cheesy, products.

The following non-limiting examples illustrate the compositions and process of manufacturing the laminated trough of the present invention:

EXAMPLE I

A prepolymer was prepared having reactable isocyanate content of 4.1% by weight and a viscosity of about 17,000 centipoises by reacting toluene diisocyanate with a mixture of polyoxypropylene diol having a molecular weight OF 2,000 and polyisobutylene diols of average molecular weight of about 1,500, with water added to adjust polyol blend to 0.3%; the mixture having been reacted essentially to completion at 95° C. for six hours. To 100 parts by weight of this prepolymer at 80° C., a mixture of 12.4 parts of 4,4' methylene-bis-2-chloroaniline and 0.087 parts of adipic acid was added at 120° C.; mixed for thirty seconds before application to a releasecoat treated spiral trough mold. After multiple coats were built up to yield proper thickness of 150 mils., (0.150 inch), and this soft elastomer was cured one-half hour at 30° C., multiple coats of a harder elastomer mixture comprising 100 parts by weight of a prepolymer at 60° C., containing reactable isocyanate content of 9.5% by weight, were mixed with a 120° C. mixture of 28 parts of 4,4' methylene-bis-2-chloroaniline and 0.12 parts of adipic acid, and the composite structure was cured 18 hours at 30° to 40° C. before demolding and attachment to rigid PVC support pipe. The resulting product exhibits chemical urethane bonding across the interface between soft and hard materials of sufficient peel strength that in a standard peel strength test the failure is in the soft elastomer leg at more than 4,000 psi tensile strength. The result is essentially the same after water immersion for thirty days. Similar tests on urethane to polyester fiberglass composites have yielded less than 100 pounds per linear inch before immersion and 10 pounds after immersion. Additional advantages of the urethane system are that application can be by pouring, troweling, automatic mixing and spray techniques without the fire hazard of the styrene containing fiberglass systems, and the lack of mineral dust in cleanup, caused by grinding with fiberglass and overspray.

EXAMPLE II

A composite structure was made up as in Example I, except the soft elastomer prepolymer contained 4,4' diphenylmethane diisocyanate instead of toluene diisocyanate. Prepolymer viscosity was higher but results similar to Example I were obtained.

EXAMPLE III

A composite structure was made up as in Example I, except that instead of using prepolymers, "one shot" techniques were used and various MDI products were used to replace the prepolymers, with isocyanate functionalities ranging from 2.0 to 3.1 and the polyol component being of higher molecular weight polyether diols for the soft elastomer, and lower molecular weight polyether diols and triols for the harder elastomer, together with a catalyst, such that the NCO to OH+$NH_2$ ratio was maintained at 1.1 to 1.0. Abrasion resistance was somewhat reduced as compared to the prepolymer/diamine system, but the rigidity and intercoat adhesion were similar.

EXAMPLE IV

A composite structure was made up as in Example I, using the same soft urethane elastomer, followed by an intercoat system or layer which reacts both with the uncured soft urethane elastomer through NCO groups of the intercoat reacting with $NH_2$ groups in the soft elastomer, and NCO groups of the soft elastomer reacting with terminal OH groups and $NH_2$ groups of the intercoat. The intercoat is composed of an unsaturated, hydroxyl terminated polyester, urethane reaction catalyst of the stannous octoate type, and polymeric MDI of 2.7 functionality, such that the NCO to (OH+$NH_2$+COOH) ratio is 1.2 to 1.0, and the catalyst adjusted to yield a ten minute pot life after mixing. The unsaturated polyester is the reaction product at 190° C. of maleic acid, adipic acid, 1,4 butane diol and is carried to an acid number of 8, hydroxyl number of approximately 240, and may be diluted with styrene or another solvent to reduce viscosity. The intercoat is brushed or sprayed upon the partially cured soft elastomer, and NCO groups in the elastomer react with OH groups and the $NH_2$ (resultant from moisture reaction) groups of the intercoat, and the NCO groups of the intercoat react with the $NH_2$ groups of the soft elastomer as well as the OH groups and moisture content of the intercoat. Subsequent application of conventional styrene/polyester fiberglass systems yield chemical addition reaction bridging between the styrene/polyester and the double bonds of the intercoat polyester. Intercoat adhesion is excellent providing no long curing time lapses are allowed between coats. Thirty day immersion tests indicate some loss of intercoat adhesion, but the adhesion is inherently far superior to that without the intercoat layer.

Having thus described in detail a preferred selection of embodiments of the present invention, it is to be appreciated and will be apparent to those skilled in the art that many physical changes could be made in the product and in the processes without altering the inventive concepts and principles embodies therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. A trough for a spiral concentrator, said trough including a top laminate comprising an abrasion resistant soft elastomer for engaging working materials and a bottom laminate comprising a rigid material chemically bonded to said top laminate for providing a structural support therefor.

2. The trough as described in claim 1 wherein said top laminate includes a soft urethane elastomer and wherein said bottom laminate includes a rigid urethane elastomer.

3. A trough for a spiral concentrator, said trough including a top laminate comprising a soft elastomer; a bottom laminate comprising a rigid material to provide structural support; and an intercoat, said intercoat chemically bonded to both top and bottom laminates.

4. The trough as described in claim 3 wherein said top laminate is a urethane elastomer; wherein said bottom laminate is a styrene/polyester; and wherein said intercoat is an unsaturated polyester with at least one terminal hydroxyl group and a polyisocyanate for chemical bonding between the intercoat and the top laminate and chemical bonding between the double bonds of the intercoat polyester and the bottom laminate.

* * * * *